(12) United States Patent
Yano

(10) Patent No.: US 6,981,325 B2
(45) Date of Patent: Jan. 3, 2006

(54) DOUBLE ROW BALL BEARING

(75) Inventor: Shuichi Yano, Kanagawa (JP)

(73) Assignee: NSK Ltd., Tokyo (JP)

( * ) Notice: Subject to any disclaimer, the term of this patent is extended or adjusted under 35 U.S.C. 154(b) by 61 days.

(21) Appl. No.: 10/681,112

(22) Filed: Oct. 9, 2003

(65) Prior Publication Data

US 2004/0068872 A1    Apr. 15, 2004

Related U.S. Application Data

(62) Division of application No. 09/557,661, filed on Apr. 25, 2000, now abandoned.

(30) Foreign Application Priority Data

Apr. 30, 1999 (JP) .............................. P. 11-124507

(51) Int. Cl.
*B21D 53/10* (2006.01)
*B21K 1/40* (2006.01)

(52) U.S. Cl. .............................. 29/898.062; 29/898.07; 384/513

(58) Field of Classification Search ............ 29/898.07, 29/896.061, 898.062, 898.064; 384/453, 384/513, 584
See application file for complete search history.

(56) References Cited

U.S. PATENT DOCUMENTS

| | | | |
|---|---|---|---|
| 2,588,459 A | | 3/1952 | Annen |
| 2,633,627 A | | 4/1953 | Olmstead |
| 3,532,401 A | * | 10/1970 | McKee ........................ 384/509 |
| 4,411,479 A | * | 10/1983 | Hirata et al. ................ 384/504 |
| 5,491,893 A | * | 2/1996 | Hurrell, II ............. 29/898.061 |
| 5,556,209 A | | 9/1996 | Obara et al. |
| 5,984,528 A | | 11/1999 | Ohtsu |
| 6,129,454 A | | 10/2000 | Obara |

FOREIGN PATENT DOCUMENTS

| | | |
|---|---|---|
| DE | 42 29 027 | 3/1994 |
| GB | 2 058 243 | 4/1981 |
| JP | 57-6125 | 1/1982 |
| JP | 57-69112 | 4/1982 |

* cited by examiner

*Primary Examiner*—Eric Compton
(74) *Attorney, Agent, or Firm*—Sughrue Mion, PLLC

(57) ABSTRACT

In a state where the axes of an inner race (20) and an outer race (30) are inclined with respect to each other, the maximum value of a clearance between the ball-fitting-direction rearward side edge portion of the second inner race raceway (22) of the inner race (20) and the ball-fitting-direction rearward side edge portion of the second outer race raceway (32) of the outer race (30) is larger than the diameter of the respective balls belonging to the second ball row. Also, the maximum value of a clearance between the ball-fitting-direction forward side edge portion of the second inner race raceway (22) of the inner race (20) and the second outer race raceway (32) edge portion on the upper side peripheral surface (33) of the outer race (30) is smaller than the diameter of the respective balls belonging to the second ball row.

1 Claim, 4 Drawing Sheets

US 6,981,325 B2

DOUBLE ROW BALL BEARING

This is a divisional of application Ser. No. 09/557,611 filed Apr. 25, 2000, abandoned; the disclosure of which is incorporated herein by reference.

BACKGROUND OF THE INVENTION

1. Field of the Invention

The present invention relates a double row ball bearing in which a first ball row is fitted into one of two rows of raceways respectively formed by an inner race and an outer race before the outer race is mounted onto the inner race and, after the outer race is mounted onto the inner race, a second ball row is fitted into the other raceway in a state where the axes of the inner and outer races are inclined with respect to each other.

2. Description of the Related Art

Conventionally, as a double row ball bearing, in Japanese Patent Unexamined Publication No. 57-6125 of Showa, there is disclosed a unit bearing 60 with a flange. As shown in FIGS. 3 and 4, into one 63 (that is, the raceway 63 which is located near the flange and, in FIG. 3, is situated on the left side) of two rows of raceways 63 and 64 respectively formed by an inner race 61 and an outer race 62, there are fitted a plurality of balls 65 and a retainer 66 before the outer race 62 is mounted onto the inner race 61, and, into the other raceway 64 (the raceway 64 which is located distant from the flange and, in FIG. 3, is situated on the right side), there are fitted a smaller number of balls 67 than the number of the balls 65 and a retainer (not shown) after the outer race 62 is mounted onto the inner race 61.

In other words, in the unit bearing 60 with a flange, at first, after the balls 65 and retainer 66 are fitted into one raceway 63, the outer race 62 is mounted onto the inner race 61. Next, the respective axes of the inner race 61 and outer race 62 are inclined with respect to each other to thereby produce such a state as shown in FIG. 3, so that, between the inner race 61 and outer race 62, there is formed such a crescent-shaped clearance 68 as shown in FIG. 4. And, through this crescent-shaped clearance 68, the balls 67 are fitted into the other raceway 64. Here, the number of the balls 67 to be fitted into the other raceway 64 is smaller than the number of the balls 65 to be fitted into one raceway 63. After then, the balls 67 are distributed equally within the other raceway 64 and the retainer is inserted into the other raceway 64.

Also, referring to FIG. 5, in Japanese Patent Unexamined Publication No. 57-69112 of Showa, there is disclosed a double row angular ball bearing 70 in which the above-mentioned crescent-shaped clearance 68 (see FIG. 4) is formed in a larger size and the number of balls to be fitted into the other raceway 72 is thereby increased.

That is, in the double row angular ball bearing 70, the inside diameter of the end portion (shown on the left side in FIG. 5) of the raceway groove 75 of an outer race 74 forming one raceway 71 into which a large number of balls 73 are to be fitted is set larger than the inside diameters of the remaining portions of the raceway groove 75 by 5% or more of the diameter of the balls.

However, in both of the above-mentioned conventional double row ball bearings 60 and 70, after the outer races 62, 74 are mounted onto their associated inner races 61, 76 respectively, the balls 67 are fitted into the other raceways 64, 72 respectively while the axes of the inner races 61, 76 are inclined with respect to the axes of their associated outer races 62, 74 respectively. Therefore, the balls 67 are easy to swerve from the other raceways 64, 72.

In other words, referring to FIG. 6, a clearance G is defined between the ball-fitting-direction forward side (in FIG. 6, the lower side) edge portion 83a of the raceway groove 83 of the inner race 80 forming the other raceway 82 and the ball-fitting-direction forward side edge portion 84a of the raceway groove 84 of the outer race 81 forming the other raceway 82, in a state where the axes of an inner race 80 and an outer race 81 are inclined with respect to each other after the outer race 81 is mounted onto the inner race 80. Then, the maximum value of the clearance G is larger than the diameter H of the respective balls 85 to be fitted into the other raceway 82. Due to this, the respective balls 85 are easy to swerve away from the other raceway 82. Therefore, there exists a problem that it takes much labor and time to incorporate the balls into the bearing, which in turn increases the cost of the bearing.

SUMMARY OF THE INVENTION

The present invention aims at solving the above problem found in the above-cited conventional double row ball bearings. Accordingly, it is an object of the invention to provide a double row ball bearing which, when, in a state where the axes of inner and outer races are inclined with respect to each other after the outer race is mounted onto the inner race, balls belonging to a ball row including a smaller number of balls are fitted into the other raceway, can secure a good operation efficiency to thereby be able to reduce the cost thereof.

In attaining the above object, according to the invention, there is provided a double row ball bearing comprising:

an inner race having first and second inner race raceways respectively formed on the outer peripheral surface thereof;

an outer race having first and second outer race raceways respectively formed on the inner peripheral surface thereof and corresponding to the first and second inner race raceways of the inner race, the outer race being to be mounted onto the inner race;

first and second raceways respectively formed between the inner race and the outer race mounted on the inner race by the mutually corresponding inner race raceways and outer race raceways of the inner and outer races;

a first ball row composed of a plurality of balls rollably fittable into the first raceway before the outer race is mounted onto the inner race;

a retainer insertable into the first raceway together with the first ball row;

a second ball row composed of balls smaller in number than the first ball row rollably fittable into the second raceway after the outer race is mounted onto the inner race; and, a retainer insertable into the second raceway together with the second ball row, wherein, when the balls belonging to the second ball row are respectively fitted into the second raceway, in a state where the axes of the inner and outer races are inclined with respect to each other, the maximum value of a clearance between the ball-fitting-direction rearward side edge portion of the second inner race raceway of the inner race forming the second raceway and the ball-fitting-direction rearward side edge portion of the second outer race raceway of the outer race forming the second raceway is larger than the diameter of the respective balls belonging to the second ball row, and the maximum value of a clearance between the ball-fitting-direction forward side edge portion of the second inner race raceway of the inner race forming the second raceway and the ball-fitting-direction forward side edge portion of the second outer race raceway of the outer race forming the second raceway is smaller than the diameter of the respective balls belonging to the second ball row.

Also, preferably, a dimension along the radial direction of the outer race between the bottom portion of the second outer race raceway of the outer race forming the second raceway and the ball-fitting-direction forward side edge portion of the second outer race raceway may be equal to or larger than 20% of the diameter of the respective balls belonging to the second ball row.

In a double row ball bearing according to the invention, in assembling thereof, after the balls belonging to the first ball row are respectively fitted into the first raceway, in a state where the axes of the inner and outer races are inclined with respect to each other, the balls belonging to the second ball row are respectively fitted into the second raceway.

When fitting the balls belonging to the second ball row into the second raceway, in a state where the axes of the inner and outer races are inclined with respect to each other, the maximum value of the clearance between the ball-fitting-direction rearward side edge portion of the second inner race raceway of the inner race forming the second raceway and the ball-fitting-direction rearward side edge portion of the second outer race raceway of the outer race forming the second raceway is larger than the diameter of the respective balls belonging to the second ball row.

Also, the maximum value of a clearance between the ball-fitting-direction forward side edge portion of the second inner race raceway of the inner race forming the second raceway and the ball-fitting-direction forward side edge portion of the second outer race raceway of the outer race forming the second raceway is smaller than the diameter of the respective balls belonging to the second ball row.

Therefore, the balls belonging to the second ball row can be respectively fitted smoothly into the second raceway while they are positively prevented from swerving from the second raceway.

DETAILED DESCRIPTION OF THE PREFERRED EMBODIMENTS

Now, description will be given below in detail of the present invention by means of the preferred embodiments shown in the accompanying drawings.

Figure 1:
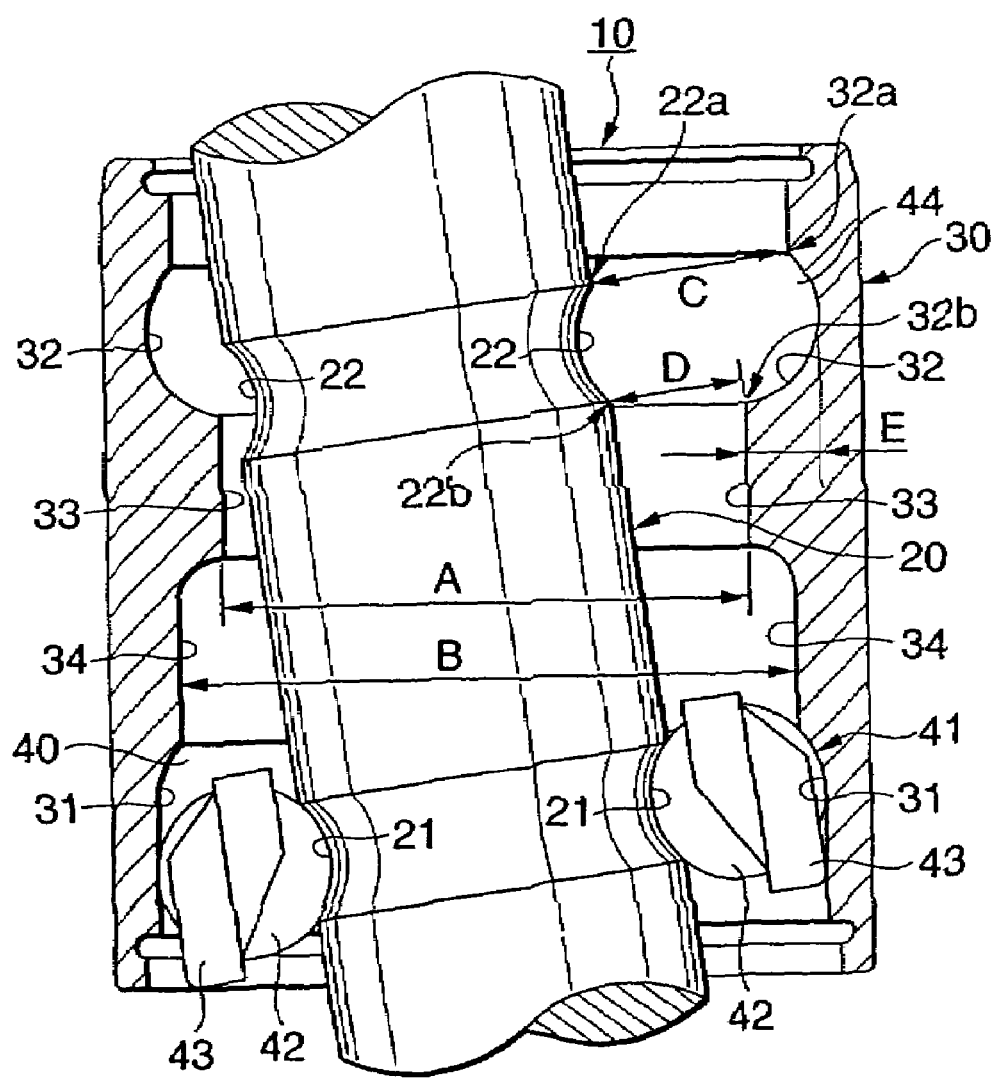
FIG. 1 is a schematic section view of a first embodiment of a double row ball bearing according to the invention, in which the axes of inner and outer races are inclined with respect to each other.

FIG. 1 is a schematic section view of a first embodiment of a double row ball bearing according to the invention, in which the axes of inner and outer races are inclined with respect to each other.

In FIG. 1, in the case of a double row ball bearing 10 to be applied to, for example, a water pump, in assembling it, into a first raceway 40 (shown on the lower side in FIG. 1) which is formed by a rotary shaft 20 (which is hereinafter referred to as an inner race 20) serving as an inner race of the bearing and an outer race 30, there are fitted a first ball row 41 and a retainer 43 before the outer race 30 is mounted onto the inner race 20. Further, in a state where the axes of the inner race 20 and outer race 30 are inclined with respect to each other (a state shown in FIG. 1) after the outer race 30 is mounted onto the inner race 20, a second ball row composed of balls smaller in number than the first ball row and a retainer (not shown) are fitted into a second raceway 44 (shown on the upper side in FIG. 1).

The inner race 20, which serves as a rotary shaft, is formed substantially in a cylindrical shape and is structured such that, as shown in FIG. 1, a first inner race raceway 21 and a second inner race raceway 22 are respectively formed in an annular shape extending along the peripheral direction of the outer peripheral surface of the inner race 20 and having a substantially semicircular section.

The outer race 30 is formed substantially in a tubular shape, and, in such a manner that the inner race 20 is fitted with the interior portion of the outer race 30, the outer race 30 is mounted onto the outer periphery of the inner race 20. In the outer race 30, a first outer race raceway 31 and a second outer race raceway 32, which are shown in FIG. 1 and correspond to the first and second inner race raceways 21 and 22 of the inner race 20, are respectively formed in an annular shape extending along the peripheral direction of the inner peripheral surface of the outer race 30 and are also disposed opposed to the first and second inner race raceways 21 and 22 of the inner race 20, while the section of each of the raceways 31 and 32 has a substantially semicircular shape.

The intermediate portion of the inner peripheral surface of the outer race 30, which is located between the first and second outer race raceways 31 and 32 of the outer race 30, is composed of two peripheral surfaces 33 and 34 having different inside diameters, while the peripheral surface 33 located near the second outer race raceway 32 of the outer race 30 (which is hereinafter referred to as the upper side peripheral surface 33) has an inside diameter A which is set smaller than the inside diameter B of the peripheral surface 34 located near the first outer race raceway 31 of the outer race 30.

In FIG. 1, the first and second raceways 40 and 44 are respectively formed between the inner race 20 and the outer race 30 mounted on the inner race 20 by the mutually corresponding first and second inner race raceways 21, 22 and first and second outer race raceways 31, 32.

Into the first raceway 40 shown in FIG. 1, before the outer race 30 is mounted onto the inner race 20, there are rotatably fitted a plurality of balls 42 belonging to the first ball row 41 and also there is incorporated the retainer 43 together with the first ball row 41.

Into the second raceway 40 shown in FIG. 1, after the outer race 30 is mounted onto the inner race 20, in a such state as shown in FIG. 1 where the axes of the inner race 20 and outer race 30 are inclined with respect to each other, there are fitted a plurality of balls (not shown) belonging to the second ball row composed of balls smaller in number than the first ball row 41 and also there is incorporated the retainer together with the second ball row.

Figure 6:
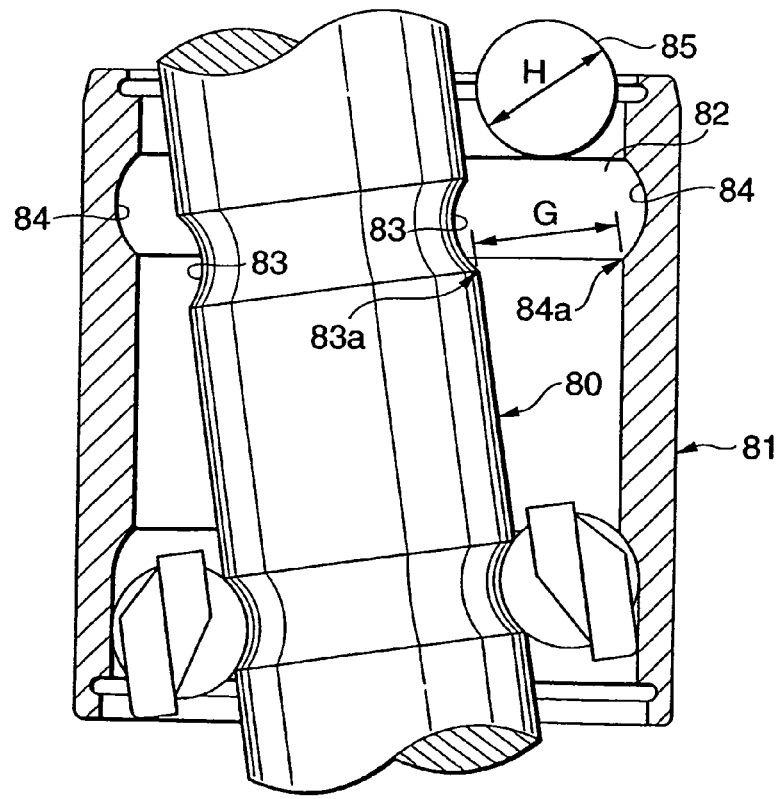

In the state shown in FIG. 1 where the axes of the inner race 20 and outer race 30 are inclined with respect to each other, the maximum value of a clearance C between the ball-fitting-direction rearward side (in FIG. 1, the upper side) edge portion 22a of the second inner race raceway 22 of the inner race 20 and the ball-fitting-direction rearward side edge portion 32a of the second outer race raceway 32 of the outer race 30 is larger than the diameter H (see FIG. 6) of the respective balls belonging to the second ball row.

Also, the maximum value of a clearance D between the second outer race raceway 32 edge portion 32a on the upper side peripheral surface 33 of the outer race 30 and the ball-fitting-direction forward side (in FIG. 1, the lower side) edge portion 22b of the second inner race raceway 22 of the inner race 20 is smaller than the diameter H (see FIG. 6) of the respective balls belonging to the second ball row.

Also, preferably, a dimension E along the radial direction of the outer race 30 between the upper side peripheral surface 33 of the outer race 30 and the bottom portion of the second outer race raceway 32 of the outer race 30 may be equal to or larger than 20% of the diameter H (see FIG. 6) of the respective balls belonging to the second ball row.

Now, description will be given below of the operation of the present embodiment.

To assemble the double row ball bearing 10, after the respective balls 42 belonging to the first ball row 41 are fitted into the first raceway 40, in the state shown in FIG. 1 where the axes of the inner race 20 and outer race 30 are inclined with respect to each other, the respective balls belonging to the second ball row are fitted into the second raceway 44.

When the respective balls belonging to the second ball row are fitted into the second raceway 44 in the state shown in FIG. 1 where the axes of the inner race 20 and outer race 30 inclined with respect to each other, the maximum value of the clearance C is set larger than the diameter H (see FIG. 6) of the respective balls belonging to the second ball row and the maximum value of the clearance D is set smaller than the diameter H (see FIG. 6) of the respective balls belonging to the second ball row. Thus, the balls belonging to the second ball row can be respectively fitted into the second raceway 44 smoothly while the balls are prevented from swerving forwardly (in FIG. 1, downwardly) in the ball-fitting direction from the second raceway 44.

Figure 2:
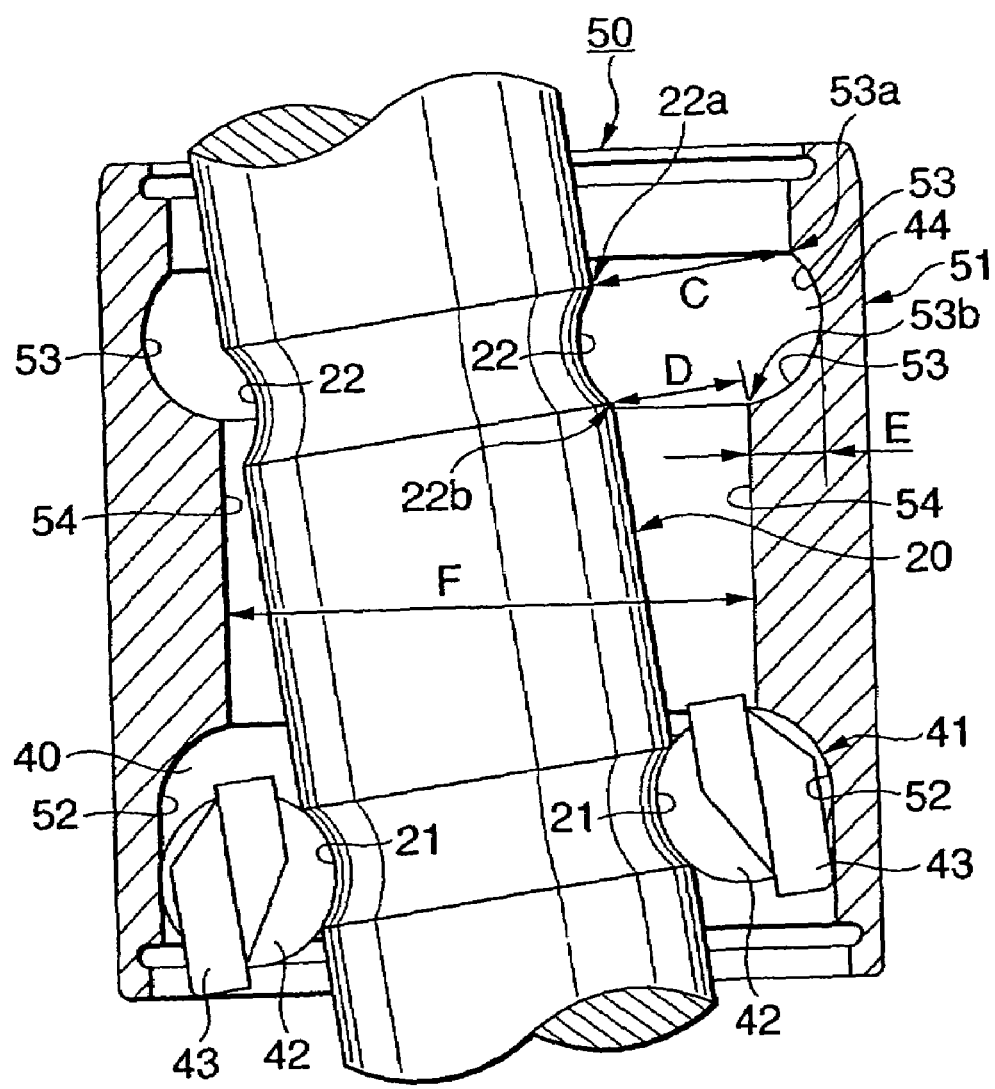
FIG. 2 is a schematic section view of a second embodiment of a double row ball bearing according to the invention, in which the axes of inner and outer races are inclined with respect to each other.
Figure 3:
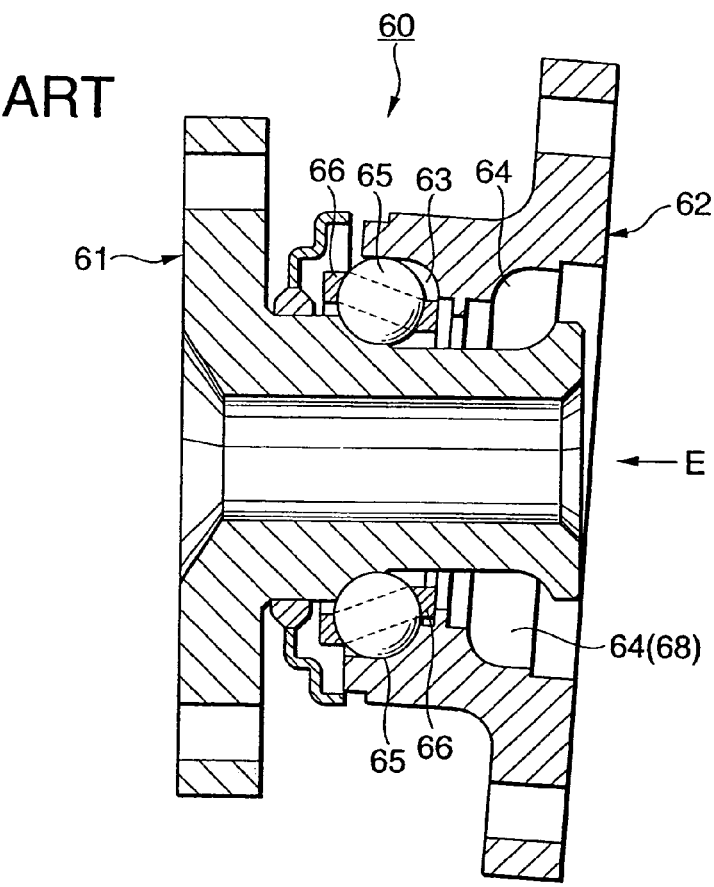
FIG. 3 is a section view of a unit bearing with a flange which is a conventional double row ball bearing, in which the axes of inner and outer races are inclined with respect to each other.
Figure 4:
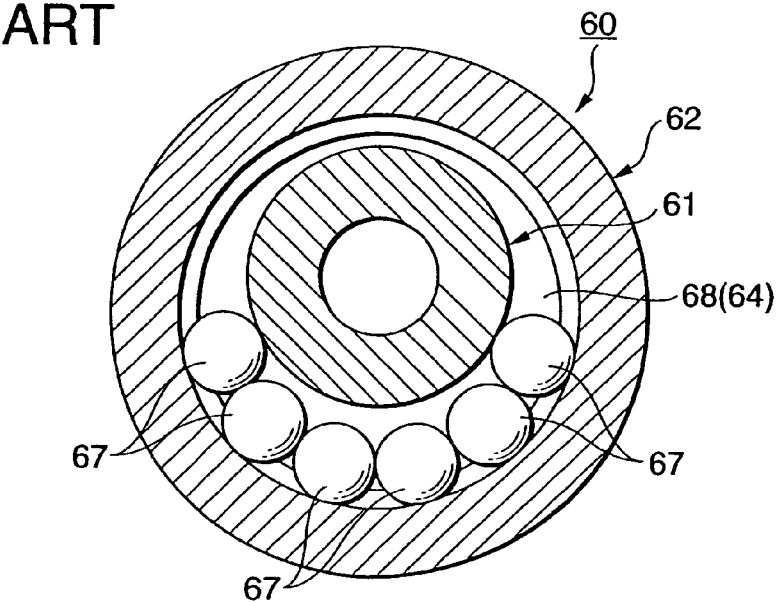
FIG. 4 is a section view of the unit bearing with a flange taken along the line E shown in FIG. 3, in which balls are fitted into the other raceway thereof.
Figure 5:
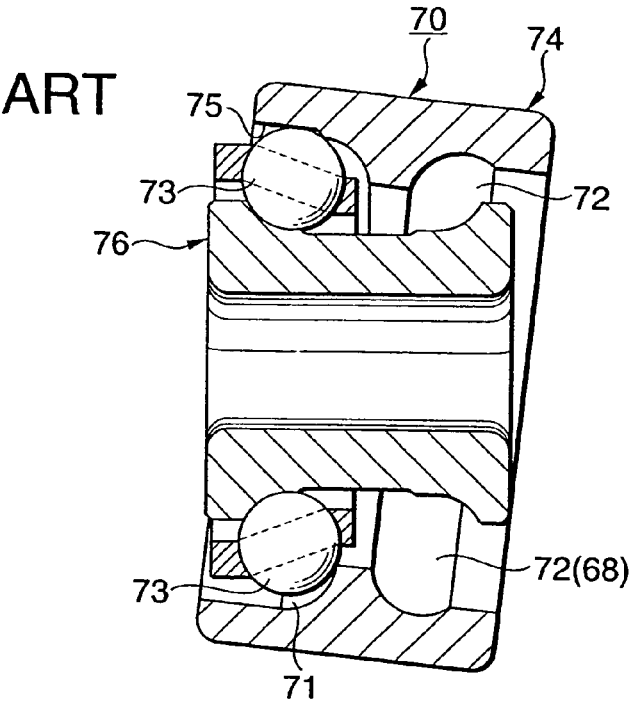
FIG. 5 is a section view of a double row angular ball bearing which is a conventional double row ball bearing, in which the axes of inner and outer races are inclined with respect to each other; and, FIG. 6 is a section view of a conventional double row ball bearing, in which the axes of inner and outer races are inclined with respect to each other.

Now, FIG. 2 is a schematic section view of a second embodiment of a double row ball bearing according to the invention, in which the axes of inner and outer races are inclined with respect to each other.

In a double row ball bearing 50 according to the second embodiment of the invention, the intermediate portion of the inner peripheral surface of an outer race 51, which is located between the first and second outer race raceways 52 and 53 of the outer race 51, is composed of a single peripheral surface 54 having a uniform inside diameter F. Also, preferably, a dimension E along the radial direction of the outer race 51 between the present peripheral surface 54 and the bottom portion of the second outer race raceway 53 of the outer race 51 may be equal to or larger than 20% of the diameter H (see FIG. 6) of the respective balls belonging to the second ball row.

The remaining portions of the structure and operation of the second embodiment are similar to those in the previously described first embodiment.

As described above, according to the above-mentioned respective embodiments, in the state shown in FIGS. 1 and 2 where the axes of the inner race 20 and outer race (30, 51) are inclined with respect to each other, the maximum value of the clearance C between the ball-fitting-direction rearward side (in FIGS. 1 and 2, the upper side) edge portion 22a of the second inner race raceway 22 of the inner race 20 and the ball-fitting-direction rearward side edge portion (32a, 53a) of the second outer race raceway (32, 53) of the outer race (30, 51) is larger than the diameter H (see FIG. 6) of the respective balls belonging to the second ball row. Also, the maximum value of the clearance D between the ball-fitting-direction forward side (in FIG. 1, the lower side) edge portion 22b of the second inner race raceway 22 of the inner race 20 and the second outer race raceway 32, 53 edge portion (32b, 53b) of the upper side peripheral surface 33 (first embodiment) or peripheral surface 54 (second embodiment) of the outer race 30, 51 is smaller than the diameter H (see FIG. 6) of the respective balls belonging to the second ball row. Also, preferably, the dimension E along the radial direction of the outer race 30, 51 between the upper side peripheral surface 33 (first embodiment) or peripheral surface 54 (second embodiment) of the outer race 30, 51 and the bottom portion of the second outer race raceway 32, 53 of the outer race 30, 51, may be equal to or larger than 20% of the diameter H (see FIG. 6) of the respective balls belonging to the second ball row.

Therefore, when the respective balls belonging to the second ball row are fitted into the second raceway 44 in the state shown in FIGS. 1 and 2 where the axes of the inner race 20 and outer race 30, 51 are inclined with respect to each other after the outer race 30, 51 is mounted on the inner race 20, the balls belonging to the second ball row can be respectively fitted into the second raceway 44 smoothly while the balls are prevented from swerving from the second raceway 44 in the downward direction in FIGS. 1 and 2. This can secure a good assembling operation efficiency as well as can reduce the cost of the double row ball bearing. Also, when the balls are fitted into the second raceway, preferably, the outer race 30, 51 may be held in such a manner that it extends in the vertical direction.

What is claimed is:

1. A method of manufacturing a double row ball bearing, the double row ball bearing including an inner race defining first and second inner race raceways respectively formed on an outer peripheral surface thereof, and an outer race defining first and second outer race raceways respectively formed on an inner peripheral surface thereof and corresponding to the first and second inner race raceways of the inner race to define first and second raceways for holding a first ball row and a second ball row, respectively, comprising:

fitting a first ball row including a plurality of balls into the first raceway before the outer race is mounted onto the inner race;

inserting a first retainer into the first raceway together with the first ball row;

mounting the outer race to the inner race to form the first and second raceways respectively defined between the inner race and the outer race by the mutually corresponding inner race raceways and outer race raceways of the inner race and the outer race;

inclining the axes of the inner race and inner outer race with respect to each other, so that the maximum value of a first clearance between a ball-fitting-direction rearward side edge portion of the second inner race raceway of the inner race forming the second raceway and a ball-fitting-direction rearward side edge portion of the second outer race raceway of the outer race forming the second raceway is larger than an outer diameter of each ball of the second ball row, and the maximum value of a second clearance between a ball-fitting-direction forward side edge portion of the second inner race raceway of the inner race forming the second raceway and a ball-fitting-direction forward side edge portion of the second outer race raceway of the outer race forming the second raceway is smaller than the outer diameter of each ball of the second ball row, fitting the second ball row including a plurality of balls into the second raceway after the outer race and inner race are mounted and inclined with respect to each other; and inserting a second retainer into the second raceway together with the second ball rows, wherein, during the fitting of the second ball row with the plurality of balls into the second raceway, the outer race is held so as to extend in a vertical direction.

\* \* \* \* \*